US010498550B2

(12) United States Patent
Anderson et al.

(10) Patent No.: US 10,498,550 B2
(45) Date of Patent: Dec. 3, 2019

(54) EVENT NOTIFICATION

(71) Applicant: International Business Machines Corporation, Armonk, NY (US)

(72) Inventors: Eric M. Anderson, Friendswood, TX (US); Szymon W. Harat, Cracow (PL); Michal P. Malczewski, Gliwice (PL)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/223,082

(22) Filed: Jul. 29, 2016

(65) Prior Publication Data
US 2018/0034650 A1 Feb. 1, 2018

(51) Int. Cl.
*H04L 12/18* (2006.01)
*H04L 12/58* (2006.01)
*H04L 29/08* (2006.01)

(52) U.S. Cl.
CPC ............ *H04L 12/185* (2013.01); *H04L 51/32* (2013.01); *H04L 67/26* (2013.01)

(58) Field of Classification Search
CPC ........ H04L 12/185; H04L 51/32; H04L 67/26
USPC .......................................................... 709/207
See application file for complete search history.

(56) References Cited

U.S. PATENT DOCUMENTS

| 8,434,095 | B2 | 4/2013 | Yu |
| 8,751,567 | B2 | 6/2014 | Chung et al. |
| 8,788,942 | B2 | 7/2014 | Jain et al. |
| 2008/0189644 | A1 | 8/2008 | Chang et al. |
| 2009/0222750 | A1* | 9/2009 | Jain ........................ G06Q 10/00 715/767 |
| 2010/0257113 | A1* | 10/2010 | Dorrell .................. G06Q 10/10 705/319 |

(Continued)

FOREIGN PATENT DOCUMENTS

WO    WO 2014005657    1/2014

OTHER PUBLICATIONS

Tracked Process Event Notification, The Best-Run Businesses Run SAP; Retrieved from Internet: Tracked Process Event Notification—Enterprise Services in SAP Event . . . https://help.sap.com/saphelp_SCM700_ehp02/helpdata/en/c3/d47c7573a . . . , Retrieved on Feb. 23, 2016, 2 pages.

(Continued)

*Primary Examiner* — Nicholas R Taylor
*Assistant Examiner* — Chong G Kim
(74) *Attorney, Agent, or Firm* — Schmeishe, Olson & Watts; Mark Vallone

(57) ABSTRACT

A method, and associated computer system and computer program product, for notifying users of events. A notification server that includes a computer receives a notification rule. The notification server generates, for the received notification rule, a unique identifier for communication using a predefined social networking service. The notification server receives an indication of an event that occurred in an event source. The notification server determines whether the received indication satisfies the notification rule. In response to determining that the received indication satisfies the notification rule, the notification server marks the received event, using the unique identifier and broadcasting the marked event using the social networking service for receipt by those users who have access to said unique identifier.

14 Claims, 3 Drawing Sheets

(56) References Cited

U.S. PATENT DOCUMENTS

| | | | |
|---|---|---|---|
| 2010/0262550 A1* | 10/2010 | Burritt | G06Q 30/02 705/319 |
| 2011/0087604 A1 | 4/2011 | Chung et al. | |
| 2011/0154370 A1* | 6/2011 | Yu | G06F 11/0709 719/318 |
| 2012/0210247 A1* | 8/2012 | Khouri | G06Q 10/101 715/751 |
| 2012/0226803 A1* | 9/2012 | Bharadwaj | H04L 41/0253 709/224 |
| 2013/0014222 A1* | 1/2013 | Bhatia | H04N 21/252 726/4 |
| 2013/0014223 A1* | 1/2013 | Bhatia | H04N 21/252 726/4 |
| 2013/0024364 A1* | 1/2013 | Shrivastava | G06Q 20/38 705/39 |
| 2013/0024788 A1* | 1/2013 | Olsen | G06Q 10/10 715/753 |
| 2013/0031487 A1* | 1/2013 | Olsen | G06Q 50/01 715/751 |
| 2013/0091213 A1* | 4/2013 | Diab | G06Q 50/01 709/204 |
| 2013/0212170 A1* | 8/2013 | Chung | G06Q 10/10 709/204 |
| 2013/0282421 A1* | 10/2013 | Graff | G06Q 10/1093 705/7.18 |
| 2013/0297361 A1 | 11/2013 | Shami et al. | |
| 2013/0298038 A1* | 11/2013 | Spivack | H04L 65/403 715/753 |
| 2013/0305322 A1* | 11/2013 | Raleigh | G06Q 30/016 726/4 |
| 2014/0019457 A1* | 1/2014 | Xie | G06F 17/30321 707/741 |
| 2014/0101255 A1* | 4/2014 | Pal | H04W 4/70 709/204 |
| 2014/0156763 A1 | 6/2014 | Dubetz et al. | |
| 2014/0337436 A1* | 11/2014 | Hoagland | G06F 17/30867 709/204 |
| 2015/0302338 A1* | 10/2015 | Zaveri | H04L 51/32 705/7.39 |
| 2015/0339581 A1* | 11/2015 | Desai | G06Q 20/322 706/48 |
| 2016/0021202 A1* | 1/2016 | Peterson | H04L 67/22 709/204 |
| 2016/0102879 A1* | 4/2016 | Guest | F24F 11/006 700/276 |
| 2016/0142894 A1* | 5/2016 | Papakonstantinou | H04W 4/023 455/404.1 |

OTHER PUBLICATIONS

Andrei Iancu, "Remarks by Director Iancu at the Intellectual Property Owners Association 46th Annual Meeting", Sep. 24, 2018, Chicago, Illinois, retrieved on Nov. 18, 2018 from the Internet, 7 pages.

* cited by examiner

EVENT NOTIFICATION

TECHNICAL FIELD

The present invention relates generally to the field of digital computer systems, and more specifically, to use of a digital computer system or digital computer for notifying users of events.

BACKGROUND

Systems providing services in a large infrastructure usually have to deal with the enormous amount of information relevant to data processes, which may include actions such as reviewing currently reported issues in the scope of interest for the systems, and also may include activities such as monitoring progress of the systems or getting important notifications. There is a continuous need, therefore, to improve access performances to such large infrastructures and in particular to improve notification methods pertinent to large infrastructures.

SUMMARY

The present invention provides a method, and associated computer system and computer program product, for notifying users of events. A notification server that comprises a computer receives a notification rule. The notification server generates, for the received notification rule, a unique identifier for communication using a predefined social networking service. The notification server receives an indication of an event that occurred in an event source. The notification server determines whether the received indication satisfies the notification rule. In response to determining that the received indication satisfies the notification rule, the notification server marks the received event, using the unique identifier and broadcasting the marked event using the social networking service for receipt by those users who have access to said unique identifier.

BRIEF DESCRIPTION OF THE DRAWINGS

In the following embodiments of the invention are explained in greater detail, by way of example only, making reference to the drawings.

DETAILED DESCRIPTION

Figure 1:
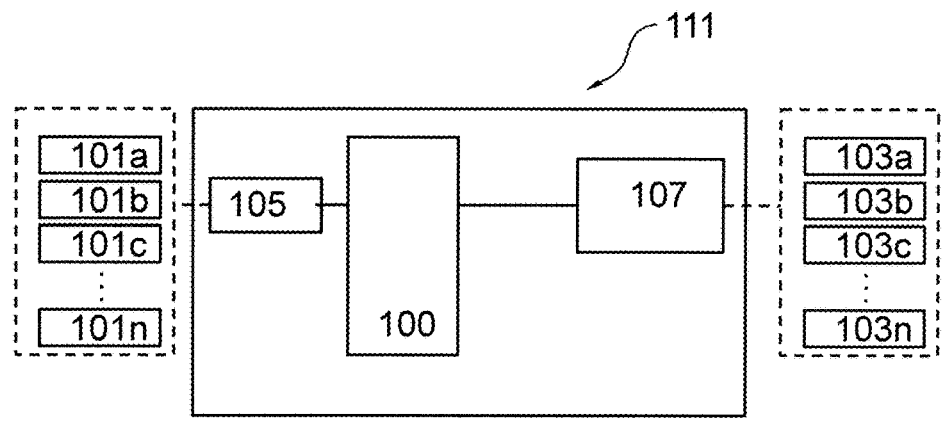
FIG. 1 depicts an example of a data processing system, in accordance with embodiments of the present invention.

In one aspect, the present invention relates to a method for notifying users of events. The method comprises: upon receipt of a notification rule generating for the received notification rule a unique identifier for communication using a predefined social networking service. An indication of an event that occurred in an event source (also referred to as event source system) may be received from the event source. It may be determined whether the received indication satisfies the notification rule. In response to determining that the received indication satisfies the notification rule, the received event (or the indication of the event) may be marked using the unique identifier. The marked event may be broadcasted (or published or posted); e.g., via an application programming interface (API) of the social networking service for receipt by those users who have access to the unique identifier.

In another aspect, the present invention relates to a computer program product comprising a computer-readable storage medium having computer-readable program code embodied therewith, the computer-readable program code configured to implement the method of the present invention.

In another aspect, the invention relates to a notification server for notifying users of events. The notification server is configured for: receiving a notification rule; generating for the received notification rule a unique identifier for communication using a predefined social networking service; receiving from an event source an indication of an event that occurred in the event source; determining whether the received indication satisfies the notification rule; in response to determining that the received indication satisfies the notification rule, marking the received event using the unique identifier and broadcasting (or publishing) the marked event using the social networking service for receipt by those users who have access to the unique identifier. In one example, the notification server may comprise an Enterprise Service Bus (ESB).

The social networking service may operate on a network of servers including, for example, web servers, memcached servers and database servers. The servers receive and store data that users send when creating the profile of the users or sending messages. Examples of social networking services may comprise Facebook®, Twitter®, YouTube®, Flicker, Chowhound®, Wikipedia Wikipedia, SharePoint®, MySpace®, YahooGroups, etc.

In the large infrastructures, there are multiple and diverse sources that need to be constantly monitored which may be inconvenient and inefficient for the end users and which consume many processing resources. The present method provides an efficient notification system that may save processing resources that would otherwise be required for performing such ad-hoc monitoring of sources of events (hereinafter, "event sources").

According to one embodiment of a method of the present invention, the event source is interoperating with one or more other event sources through a notification server using a first communication protocol. The method comprises providing a second communication protocol for determining, by the notification server, whether a received indication satisfies a notification rule. A communication protocol (e.g., the first and second communication protocols) may comprise a system of rules that allow two or more entities of a communications system to transmit information and/or allow the notification server to interpret data received at the notification server. The rules may, for example, comprise a data format of data to be transmitted or to be processed. The communication protocol may, for example, be an Internet of Things (IoT) communication protocol. For example, the first communication protocol may provide a common data format into which messages or data received from different sources are transformed. The transformed messages may be processed by the notification server to store the received messages and/or send the received messages to a target system that is indicated in the received message. The first communication protocol may for example comprise Java Message Service (JMS) protocol.

This embodiment may provide a centralized control of the notifications, which may have an advantage of providing a uniform and consistent messaging system for all sources.

According to one embodiment, the first and second communication protocols are different or identical. The second communication protocol may, for example, define the format of data to be processed by the notification server and/or to be broadcasted using the social networking service. In one example, the notification server may transform the format of the received indication of the event into a format supported by the second communication protocol.

An embodiment may enable implementing the present method on a large sample of infrastructures since this embodiment may not be constrained to, for example, a single communication protocol.

According to one embodiment, the receiving of the indication of the event comprises: receiving at the notification server an event publication request from the event source; and adapting the received indication in accordance with the second communication protocol for determining whether the received indication satisfies the notification rule.

According to one embodiment, the notification server is (or is part of) an Enterprise Service Bus (ESB). In other words, the ESB may be configured so as to perform at least part of the present method. This embodiment may seamlessly be integrated in existing systems that integrate numerous applications together over the ESB.

According to one embodiment, the method further comprises: in response to receiving at the ESB from one or more social networking services a subscription request, selecting the predefined social networking service as one subscribed social networking service of the subscribed social networking services.

According to one embodiment, the predefined social networking service is a selected social networking service of multiple social networking services.

According to one embodiment, the selected social network service is user defined.

Embodiments of the present invention may provide a secure and controlled access to the dispatched notifications by choosing the adequate social networking service.

According to one embodiment, determining whether the received indication satisfies the notification rule comprises; sending by the notification server a message to a social medial notification engine of the social networking service; and controlling the social medial notification engine to determine whether the received indication satisfies the notification rule in accordance with the social networking service.

According to one embodiment, a unique identifier comprises a hashtag. For example, the social networking service may be Twitter®. The hashtag may be randomly generated in an effort to make the hashtags semi-private such that the hashtags can be easily shared among interested parties while being meaningless for other parties in the same time frame.

FIG. 1 illustrates an example of a data processing system 111, in accordance with embodiments of the present invention. The data processing system 111 is a computer system that may include a notification server 100 and one or more event source systems 101a-n. The event source systems 101a-n may be connected to the notification server 100 via a first network, which may be a private network (e.g., a local area network (LAN), wide area network (WAN), intranet, etc.), a public network (e.g., the Internet) or a combination thereof.

At least one event source system (e.g., 101a) of the event source systems 101a-n may be a computing device such as, for example, a desktop computer, laptop computer, server, cellular phone, personal digital assistant (PDA), etc. The event source system 101a may communicate with the notification server 100 by exchanging messages via standard protocols (e.g., FTP, HTTP).

In one example, the event source systems 101a-n (things) may form an Internet of Things (IoT) network that enables the event source systems to collect, send and/or exchange data directly or via the notification server 100. The data of the event source systems 101a-n may be transmitted; e.g., via the Internet to the notification server that may play a role of an integrator where the received data are analyzed and acted upon in accordance with IoT methods.

One or more applications services 103a-n may subscribe or register to the notification server 100 by, for example, sending a subscription request to the notification server 100. The notification server 100 may or may not send a subscription confirmation to the sender of the subscription request. The application services 103a-n may connect to the notification server 100 via the first network or via a different second network. The second network may be a private network (e.g., a local area network (LAN), wide area network (WAN), intranet, etc.), a public network (e.g., the Internet), or a combination thereof.

The notification server 100 comprises a source interface 105 which is configured to provide access to the notification server 100 for an event source system (e.g., 101a). The notification server 100 further comprises a service interface 107 which is configured to provide access to the application services 103a-n for the notification server 100.

Through the notification server 100, the event source systems 101 may exchange data or send messages to be stored by the notification server 100; e.g., for subsequent uses by a user of the notification server 100.

The event source systems 101a-n, the notification server 100 and the application services 103a-n may communicate using a same communication protocol or different communication protocols.

In one example, the notification server 100 may convert request messages or data received from an event source system (e.g., 101a) destined to a target system, because the target system and the event source system may utilize different messaging formats and communication protocols. The target system may comprise an application service 103a-n or another event source system (e.g., 101b). For example, a received message may be converted from a Simple Object Access Protocol (SOAP) format over HyperText Transfer Protocol (HTTP) protocol to the SOAP format over Message Queue (MQ) protocol in order for the target system to receive and service the request if the formal messaging protocol of a provider application that provided the message is MQ instead of HTTP. The message may also be converted from the application format of the event source system to a messaging format capable of being interpreted by the target system.

In another example, the notification server 100 may convert data received from an event source system (e.g., 101a) into a common format that can be interpreted or processed by the application services 103a-n.

In one example, the notification server 100 may be part of an ESB server or any server that provides a deployed service to a client that communicates with the notification server 100 by messages.

In another example, the notification server 100 may be part of a notification system or engine of a social networking service such as Twitter® or Facebook®. For example, the notification engine of social networking service such as Twitter® or Facebook® may be configured to perform at least part of the present method.

Figure 2:
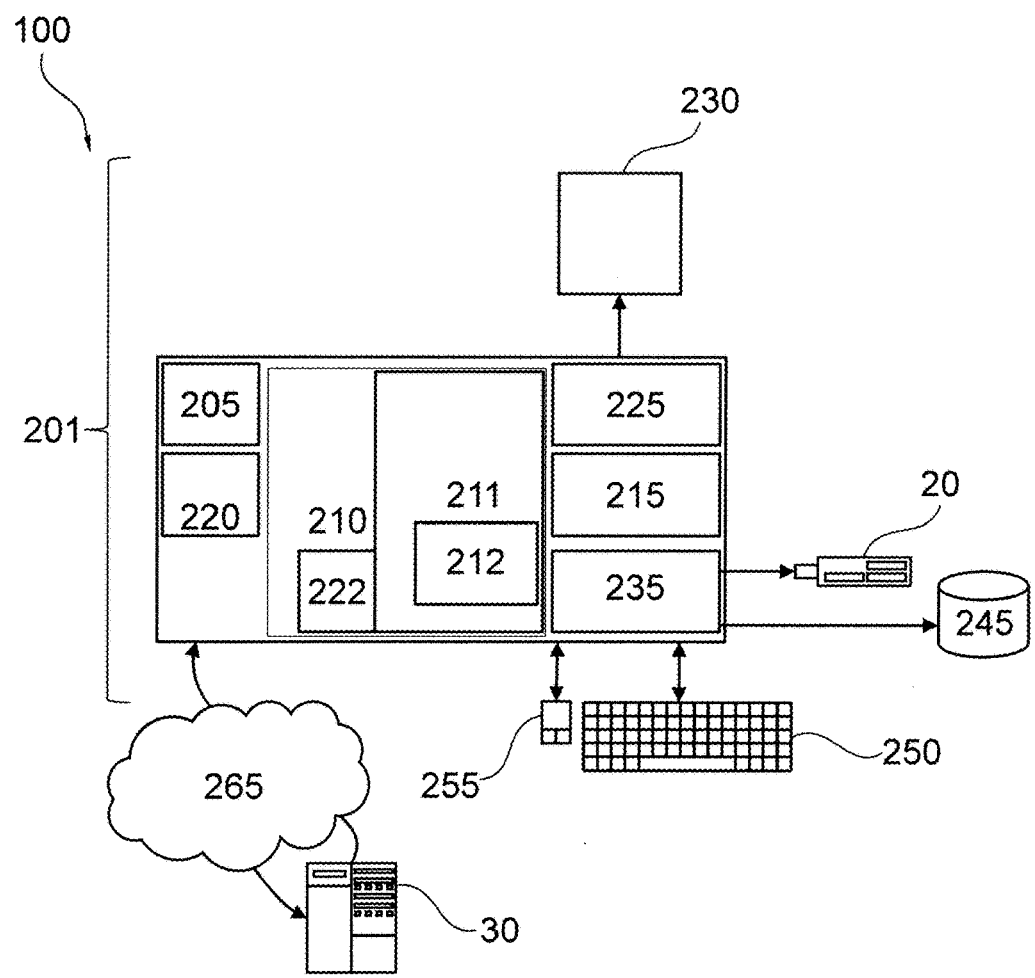
FIG. 2 depicts an example hardware implementation of a processing system, such as a notification server, that may be used in conjunction with the data processing system of FIG. 1, in accordance with embodiments of the present invention.

FIG. 2 depicts an example hardware implementation of a processing system, such as a notification server 100, that may be used in conjunction with the data processing system 111 of FIG. 1, in accordance with embodiments of the present invention. In one embodiment, the data processing system 111 includes the notification server 100 as shown in FIG. 1. The notification serve 100 of FIG. 2 represents a computerized system, including computer 201, suited for implementing method steps of the present invention. The computer 201 may be a general-purpose computer. Alternatively, the computer 201 may be a special-purpose computer or machine that includes specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software program code 212 firmware 222), hardware (processor) 205, or a combination thereof. In some exemplary embodiments, the methods described herein are implemented in software, as an executable program, and is executed by a special or general-purpose digital computer, such as a personal computer, workstation, minicomputer, or mainframe computer.

In exemplary embodiments, in terms of hardware architecture, as shown in FIG. 2, the computer 201 includes a processor 205, memory main memory) 210 coupled to a memory controller 215, and one or more input and/or output (I/O) devices (or peripherals) 20, 245 that are communicatively coupled via a local input/output controller 235. The input/output controller 235 can be, but is not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, a local interface (not shown in FIG. 2) may include address, control, and/or data connections to enable appropriate communications among the aforementioned components in FIG. 2. As described herein, the I/O devices 10, 245 may generally include any generalized cryptographic card or smart card known in the art.

The processor 205 is a hardware device, or alternatively a plurality of hardware devices, for executing software, particularly software stored in memory 210. The processor 205 can be any custom made or commercially available processor, a central processing unit (CPU), an auxiliary processor among several processors associated with the computer 201, a semiconductor based microprocessor (in the form of a microchip or chip set), a macroprocessor, or generally any device for executing software instructions.

The memory 210 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). In one embodiment, the memory 210 can have a distributed architecture, where various components are situated remote from one another, but can be accessed by the processor 205.

The software in memory 210 may include one or more separate software programs, each of which comprises an ordered listing of executable instructions for implementing methods and logical functions involved in embodiments of this invention. In FIG. 2, software in the memory 210 includes program code (i.e., instructions) 212; e.g., instructions to manage databases such as a database management system.

The software in memory 210 includes a suitable operating system (OS) 211. The OS 211 essentially controls the execution of other computer programs, such as possibly program code 212 for implementing methods as described herein.

The program code 212 described herein may be a source program, executable program code (e.g., object code), script, or any other entity comprising a set of instructions to be performed. A source program needs to be translated via a compiler, assembler, interpreter, or the like, which may or may not be included within the memory 210, so as to operate properly in connection with the OS 211. Furthermore, the program code can be written in an object oriented programming language which has classes of data and methods, or a procedural programming language which has routines, subroutines, and/or functions.

In exemplary embodiments, a conventional keyboard 250 and mouse 255 can be coupled to the input/output controller 235. Other output devices such as the I/O devices 245 may include input devices, for example but not limited to a printer, a scanner, microphone, and the like. Finally, the I/O devices 20, 245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 20, 245 can be any generalized cryptographic card or smart card known in the art. The system 100 can further include a display controller 225 coupled to a display 230. In exemplary embodiments, the system 100 can further include a network interface for coupling to a network 265. The network 265 can be an IP-based network for communication between the computer 201 and any external server, client and the like via a broadband connection. The network 265 transmits and receives data between the computer 201 and external systems 30, which can be involved to perform part or all of the steps of the methods discussed herein. In exemplary embodiments, network 265 can be a managed IP network administered by a service provider. The network 265 may be implemented in a wireless fashion; e.g., using wireless protocols and technologies, such as WiFi, WiMax, etc. The network 265 can also be a packet-switched network such as a local area network, wide area network, metropolitan area network. Internet network, or other similar type of network environment. The network 265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 201 is a PC, workstation, intelligent device or the like, the software in the memory 210 may further include a basic input output system (BIOS) 222. The BIOS is a set of essential software routines that initialize and test hardware at startup, start the OS 211, and support the transfer of data among the hardware devices. The BIOS is stored in ROM so that the BIOS can be executed when the computer 201 is activated.

When the computer 201 is in operation, the processor 205 is configured to execute program code 212 stored within the memory 210, to communicate data to and from the memory 210, and to generally control operations of the computer 201. The methods described herein and the OS 211, in whole or in part, but typically the latter, are read by the processor 205, possibly buffered within the processor 205, and then executed.

When the systems and methods described herein are implemented in software as program code 212, as is shown in FIG. 2, the methods can be stored on any hardware computer readable medium, such as storage 220, for use by or in connection with any computer related system or method. The storage 220 may comprise a disk storage such as hard disk drive (HDD) storage.

Figure 3:
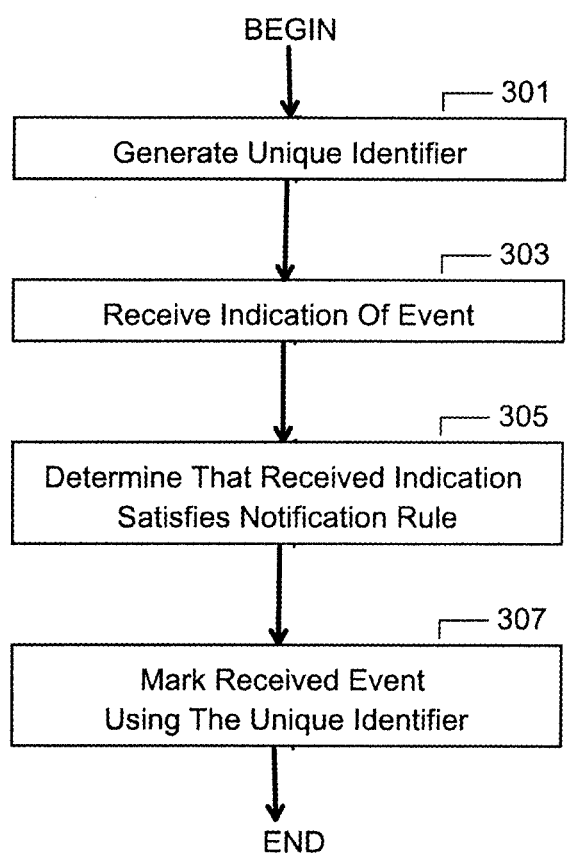
FIG. 3 is a flowchart of a method for notifying users of events, in accordance with embodiments of the present invention.

FIG. 3 is a flowchart of a method for notifying users of events, in accordance with embodiments of the present invention. The term "user" may refer to an entity; e.g., an individual, a computer, or an application executing on a computer.

In step 301, a unique identifier is generated for a given notification rule. The unique identifier may be used for communication using a predefined social networking service (e.g. application service 103a-n) such as Twitter® or Facebook®. The unique identifier may be used to uniquely identify the notification rule and may be used to tag messages related to that notification rule which makes it easier for users to find messages or notifications with a specific theme or content related to the notification rule.

For example, the predefined social networking service may be selected among multiple social networking services in order to generate the unique identifier. In another example, step 301 may comprise generating for each social networking service of the multiple social networking services a respective unique identifier for communication using the each social networking service; then the selection of one or more of the unique identifiers may be performed for performing the notification.

In one example, the unique identifier may be generated automatically (e.g. randomly). In another example, the generating of the unique identifier may comprise using a predefined identifier as the unique identifier. The predefined identifier may, for example, be received from a user. In another example, the generating of the unique identifier may comprise prompting user for providing an identifier, receiving the identifier in response to prompting the user, and verifying that the received identifier is unique. In case the received identifier is not unique, the prompting is iteratively repeated until the received identifier is a unique identifier.

The unique identifier may for example be used to refer to a tag embedded in a message posted on the social networking service. In case of Twitter® social networking service, the unique identifier may include a word within the message prefixed by a hash sign (#). In case of YouTube®, the unique identifier may comprise a channel name and the event notification may be performed in the form of a video message.

The notification rule may, for example, comprise one or more conditions on values of one or more parameters. For example, the notification rule may comprise a condition on the number of received events per user; e.g., the notification is performed in case the number of received events (including the last received event) from the user or the source system is higher than a predefined threshold. In another example, the notification rule may comprise a condition on the severity level of a given received event such as a software bug; e.g., the notification is performed in case the severity level is higher than a predefined threshold. For example, a bug in the operating system of the source system of the event may have the highest severity level. A bug in the displaying options of that source system may have a lower severity level. The definition of the notification rule may have the advantage of an efficient and individual controlling of the source systems.

For example, the notification rule may be in the form of a formula, a look-up table, an association list, or other suitable format for describing a rule.

In one example, the notification rule may be received from a user of the users to be notified. And, the unique identifier may be generated upon receipt of the notification rule. In another example, the notification rule may be generated; e.g., as soon as the source system is integrated or included in the data processing system 111, the notification rule and the unique identifier may be generated automatically for that source system.

In step 303, an indication of an event that occurred in an event source (or event source system) is received. For example, each event source system of the event source systems 101a-n may be configured to automatically send the indication of the event upon detecting the event. The term "event" may refer to an information technology (IT) event occurring at the event source system or detected by the event source system and is identified by a corresponding notification/message detailing the event. The event may for example refer to a state of the event source system and or to a measurement performed by the event source system. The event source system may, for example, be a temperature sensor. In case the sensed temperature is higher than a predefined maximum temperature, the event may be detected by the event source system.

The format of the received indication of the event may be in accordance with a communication protocol that is supported by the data processing system 111, such that the indication may be read and interpreted in accordance with the communication protocol in order to be checked against the notification rule.

The received indication may be checked against the notification rule in order to determine whether (the received indication satisfies the notification rule. For example, a counter may be associated to each or to all event source systems. As soon as an indication of an event is received from an event source system, the counter may be incremented (e.g. by 1). The notification rule may, in this example, be checked by comparing the new value of the counter (i.e., upon receiving the event) to a predefined threshold. A determination that the counter is higher than the predefined threshold in step 305 means that the received indication satisfies the notification rule.

In response to determining that the received indication satisfies the notification rule, the received event may be marked (i.e., recorded) in step 307 using the unique identifier. The marked event may be broadcasted (e.g., in the form of a message via an application programming interface (API) of the social networking service for receipt by those users who have access to the unique identifier). If access to the unique identifier is restricted, the users may have access to the unique identifier if the users subscribe for access to the unique identifier. However, in case the unique identifier is public, the users may have access to the unique identifier without subscription to the access.

The broadcasting may for example be performed using other determined unique identifiers as described above in order to broadcast the message over the multiple social networking services. The social networking service may provide programmable access via the API. The API may, for example, be defined as a set of Hypertext Transfer Protocol (HTTP) request messages. The broadcasting may, for example, further comprise notifying the users that have the access right to the unique identifier (e.g., by a sending a warning message to each of the users indicating the marked event). In another example, the broadcasting may comprise publishing or posting the marked event on the social networking service (e.g., a Twit® or a Facebook® publication).

Figure 4:
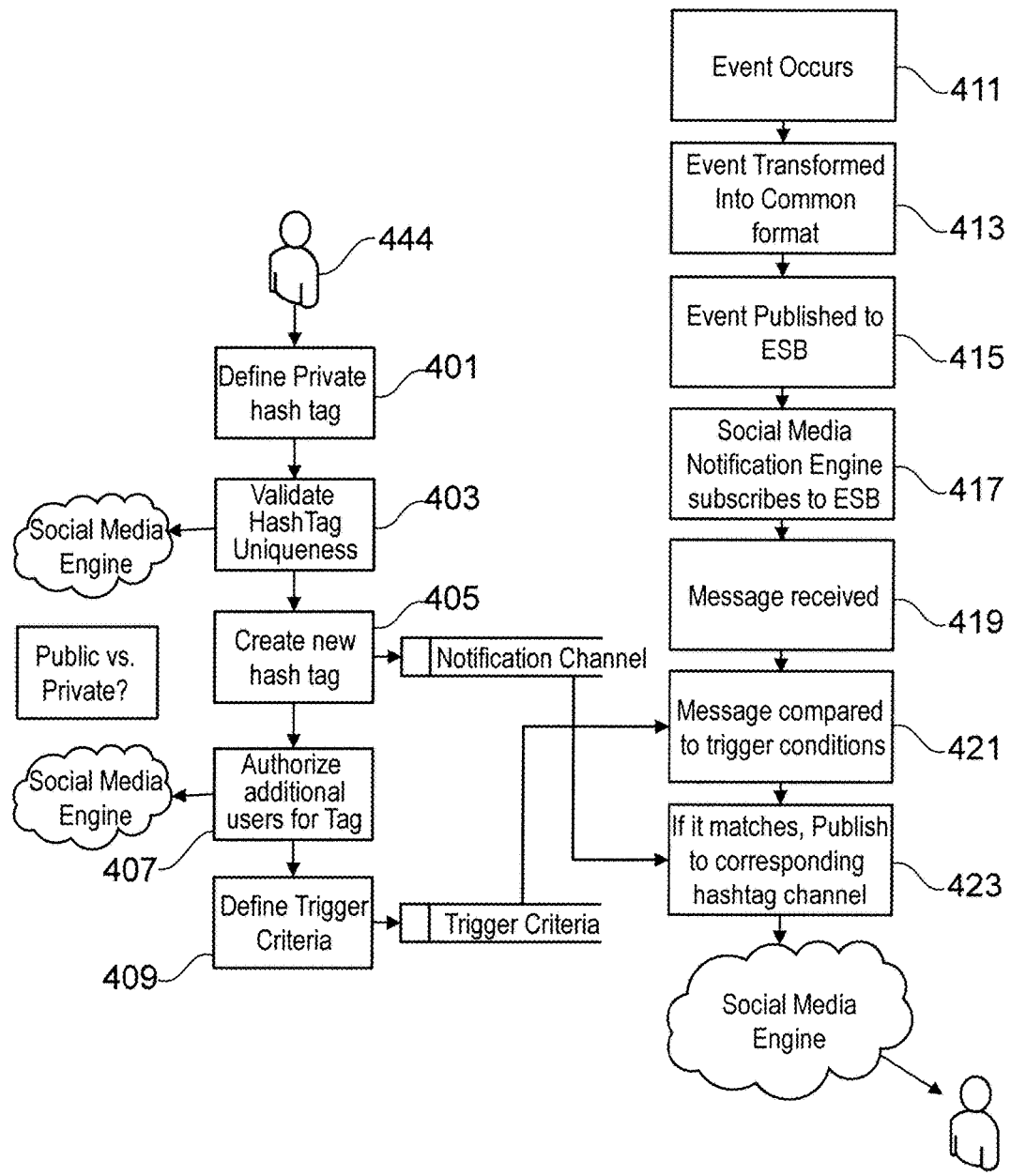
FIG. 4 is a flowchart of another method for notifying users of events, in accordance with embodiments of the present invention.

FIG. 4 is a flowchart of another method for notifying users of events, in accordance with embodiments of the present invention. New inputs may, for example, be received from a user 444 of the notification server 100. The new inputs indicate that a new notification event needs to be defined and sent to other users (e.g., forming a team or group with the user) when an incident is created for a specific application of a source system (e.g., 101a-n). In this example, the notification server may, for example, be part of a social media solution of the user's choice.

In step 401, a desired hashtag may be entered utilizing a user interface (e.g., of the notification server 100). In another example, a request may be received via the user interface to generate a random hashtag.

In step 403, the hashtag may be validated for uniqueness via the notification server which may be part of the social media engine of choice and saved as a new hashtag (step 405) to a data store.

In step 407, additional (to the initial users; e.g., forming the group or team) users may be authorized to view the hashtag, or the hashtag may be set as public (allowing anyone to follow the events) based on received user inputs or user requests, In step 409, a notification rule or trigger criteria may be received from the user 444. As an example, a received message from a source system (e.g., a Systems Applications and Products (SAP) application) indicating a problem or bug or incident having a severity of defined level one, may trigger the submission of the specifics by using a Twitter® hashtag to tag a message that contains the specifics and then the message is sent.

In step 411, an indication of an event that occurred in a source system, such as a service management system may be received.

In step 413, the received indication may be converted to a common format (eliminating the dependency on a specific service management system); e.g., by the ESB. In one embodiment, the notification server may be part of the notification system of the social networking service (e.g., not part of the ESB).

In step 415, the event may be published to the ESB.

One or more systems may be subscribing in step 417 to the ESB channel, including a notification engine. When the event is published to the ESB, the notification engine's subscription receives the message in step 419.

The message is compared in step 421 to the trigger criteria to determine if any rules match. If the message matches the trigger criteria, the notification engine may use the hashtag to create and send the message (e.g., via a notification channel as illustrated in FIG. 4). A message is then published in step 423 to the social media engine and anyone who is following that hashtag receives the notification.

In another example, another method for notifying users of events is provided. The method comprises the steps: upon receipt of a rule, generating a unique hashtag identifier, monitoring events occurring at one or more event sources; marking those of the monitored events that satisfy the rule with the hashtag identifier; feeding the marked events into an ESB, broadcasting the marked events from the ESB to a user community via Social Media integration for receipt by those users who have subscribed to the marked events.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices storing computer readable program code. The program code is executable, by at least one processor or by a notification server comprising a computer that includes one or more processors, to implement the methods of the present invention.

A computer system of the present invention comprises: one or more hardware storage devices and (i) a notification server comprising a computer that includes one or more processors and/or (ii) a computer comprising at least one processor and one or more memories. The one or more hardware storage devices stores program code executable, by the notification server or by the at least one processor via the one or more memories, to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for efficiently monitoring multiple and diverse source computing devices of a data processing system, said method comprising:
monitoring, by a notification server comprising a server computer, the multiple and diverse source computing devices that would otherwise have been monitored by end users for information technology (IT) events occurring at the multiple and diverse source computing devices, said monitoring by the notification server saving processing resources that would otherwise have been required if the monitoring had instead been performed by the end users, said server computer being external to the multiple and diverse source computing devices, said monitoring by the notification server comprising:
receiving, by the notification server from a first user computer of a plurality of user computers, a notification rule for the IT events, said server computer being external to the plurality of user computers;

generating, by the notification server, for the received notification rule a unique identifier for communication using a predefined social networking service, said notification rule having been generated as soon as the multiple and diverse source computing devices were integrated within the data processing system;

receiving, by the notification server, an indication of an IT event that occurred in a source computing device of the multiple and diverse source computing devices, wherein the received notification identifies a software bug associated with the IT event, and wherein the notification rule is a condition of a severity level of the software bug exceeding a predefined threshold;

determining, by the notification server, whether the received indication satisfies the notification rule; and in response to determining that the received indication satisfies the notification rule, marking, by the notification server, the received IT event using the unique identifier and broadcasting the marked IT event using the social networking service for receipt by one or more user computers of the plurality of user computers having access to the unique identifier, wherein said notification server being an Enterprise Service Bus (ESB), and wherein the unique identifier comprises a hashtag.

2. The method of claim 1, wherein the source computing device is interoperating with one or more other source computing devices of the multiple and diverse source computing devices through the notification server using a first communication protocol, wherein said determining, by the notification server, whether the received indication satisfies the notification rule comprises determining, by the notification server using a second communication protocol that differs from the first protocol, whether the received indication satisfies the notification rule.

3. The method of claim 2, said receiving the indication of the event comprising:

receiving, by the notification server, an event publication request from the source computing device;

configuring the received indication in accordance with the second communication protocol for determining whether the received indication satisfies the notification rule.

4. The method of claim 1, said method further comprising:

in response to receiving at the ESB from one or more social networking services a subscription request, selecting, by the notification server, the predefined social networking service as one of the subscribed social networking services.

5. The method of claim 1, wherein said determining whether the received indication satisfies the notification rule comprising:

sending a message to a social medial notification engine of the social networking service; and controlling the social medial notification engine to determine whether the received indication satisfies the notification rule in accordance with the social networking service.

6. A computer program product, comprising: one or more computer readable hardware storage devices having computer readable program code stored therein, said program code executable by a notification server to implement a method for efficiently monitoring multiple and diverse source computing devices of a data processing system, said method comprising:

monitoring, by the notification server comprising a server computer, the multiple and diverse source computing devices that would otherwise have been monitored by end users for information technology (IT) events occurring at the multiple and diverse source computing devices, said monitoring by the notification server saving processing resources that would otherwise have been required if the monitoring had instead been performed by the end users, said server computer being external to the multiple and diverse source computing devices, said monitoring by the notification server comprising:

receiving, by the notification server from a first user computer of a plurality of user computers, a notification rule for the IT events, said server computer being external to the plurality of user computers;

generating, by the notification server, for the received notification rule a unique identifier for communication using a predefined social networking service, said notification rule having been generated as soon as the multiple and diverse source computing devices were integrated within the data processing system;

receiving, by the notification server, an indication of an IT event that occurred in a source computing device of the multiple and diverse source computing devices, wherein the received notification identifies a software bug associated with the IT event, and wherein the notification rule is a condition of a severity level of the software bug exceeding a predefined threshold;

determining, by the notification server, whether the received indication satisfies the notification rule; and in response to determining that the received indication satisfies the notification rule, marking, by the notification server, the received IT event using the unique identifier and broadcasting the marked IT event using the social networking service for receipt by one or more user computers of the plurality of user computers having access to the unique identifier, wherein said notification server being an Enterprise Service Bus (ESB), and wherein the unique identifier comprises a hashtag.

7. The computer program product of claim 6, wherein the source computing device is interoperating with one or more other source computing devices of the multiple and diverse source computing devices through the notification server using a first communication protocol, wherein said determining, by the notification server, whether the received indication satisfies the notification rule comprises determining, by the notification server using a second communication protocol that differs from the first protocol, whether the received indication satisfies the notification rule.

8. The computer program product of claim 7, said receiving the indication of the event comprising:

receiving, by the notification server, an event publication request from the source computing device; and configuring the received indication in accordance with the second communication protocol for determining whether the received indication satisfies the notification rule.

9. A computer system, comprising: a notification server comprising a computer that includes at least one processor, one or more memories, and one or more computer readable hardware storage devices, said one or more hardware storage device storing program code executable, by the notification server to implement a method for efficiently monitoring multiple and diverse source computing devices of a data processing system, said method comprising:

monitoring, by the notification server comprising a server computer, the multiple and diverse source computing devices that would otherwise have been monitored by end users for information technology (IT) events occurring at the multiple and diverse source computing devices, said monitoring by the notification server saving processing resources that would otherwise have been required if the monitoring had instead been performed by the end users, said server computer being external to the multiple and diverse source computing devices, said monitoring by the notification server comprising:

receiving, by the notification server from a first user computer of a plurality of user computers, a notification rule for the IT events, said server computer being external to the plurality of user computers;

generating, by the notification server, for the received notification rule a unique identifier for communication using a predefined social networking service, said notification rule having been generated as soon as the multiple and diverse source computing devices were integrated within the data processing system;

receiving, by the notification server, an indication of an IT event that occurred in a source computing device of the multiple and diverse source computing devices, wherein the received notification identifies a software bug associated with the IT event, and wherein the notification rule is a condition of a severity level of the software bug exceeding a predefined threshold;

determining, by the notification server, whether the received indication satisfies the notification rule; and in response to determining that the received indication satisfies the notification rule, marking, by the notification server, the received IT event using the unique identifier and broadcasting the marked IT event using the social networking service for receipt by one or more user computers of the plurality of user computers having access to the unique identifier, wherein said notification server being an Enterprise Service Bus (ESB), and wherein the unique identifier comprises a hashtag.

10. The computer system of claim 9, wherein the source computing device is interoperating with one or more other source computing devices of the multiple and diverse source computing devices through the notification server using a first communication protocol, wherein said determining, by the notification server, whether the received indication satisfies the notification rule comprises determining, by the notification server using a second communication protocol that differs from the first protocol, whether the received indication satisfies the notification rule.

11. The computer system of claim 10, said receiving the indication of the event comprising:

receiving, by the notification server, an event publication request from the source computing device; and configuring the received indication in accordance with the second communication protocol for determining whether the received indication satisfies the notification rule.

12. The method of claim 1, wherein the one or more user computers comprise the first computer.

13. The method of claim 1, wherein said generating the unique identifier comprises:

prompting, by the server computer, a user for providing the identifier;

receiving, by the server computer from the user, the identifier in response to said prompting;

ascertaining, by the server computer, whether the received identifier is unique; and if said ascertaining ascertains that the received identifier is not unique then iteratively repeating said prompting, said receiving the identifier, and said ascertaining until said ascertaining ascertains that the received identifier is unique, wherein said ascertaining ascertains at least once that the received identifier is not unique.

14. The method of claim 1, wherein a software bug in an operating system of the user computer has a highest severity level, and wherein a bug in display options of the user computer has a lower severity level than the highest severity level.

* * * * *